Oct. 9, 1928.
E. BENSON ET AL
1,687,119
LIGHT DISTRIBUTING DEVICE
Filed March 13, 1923   2 Sheets-Sheet 1
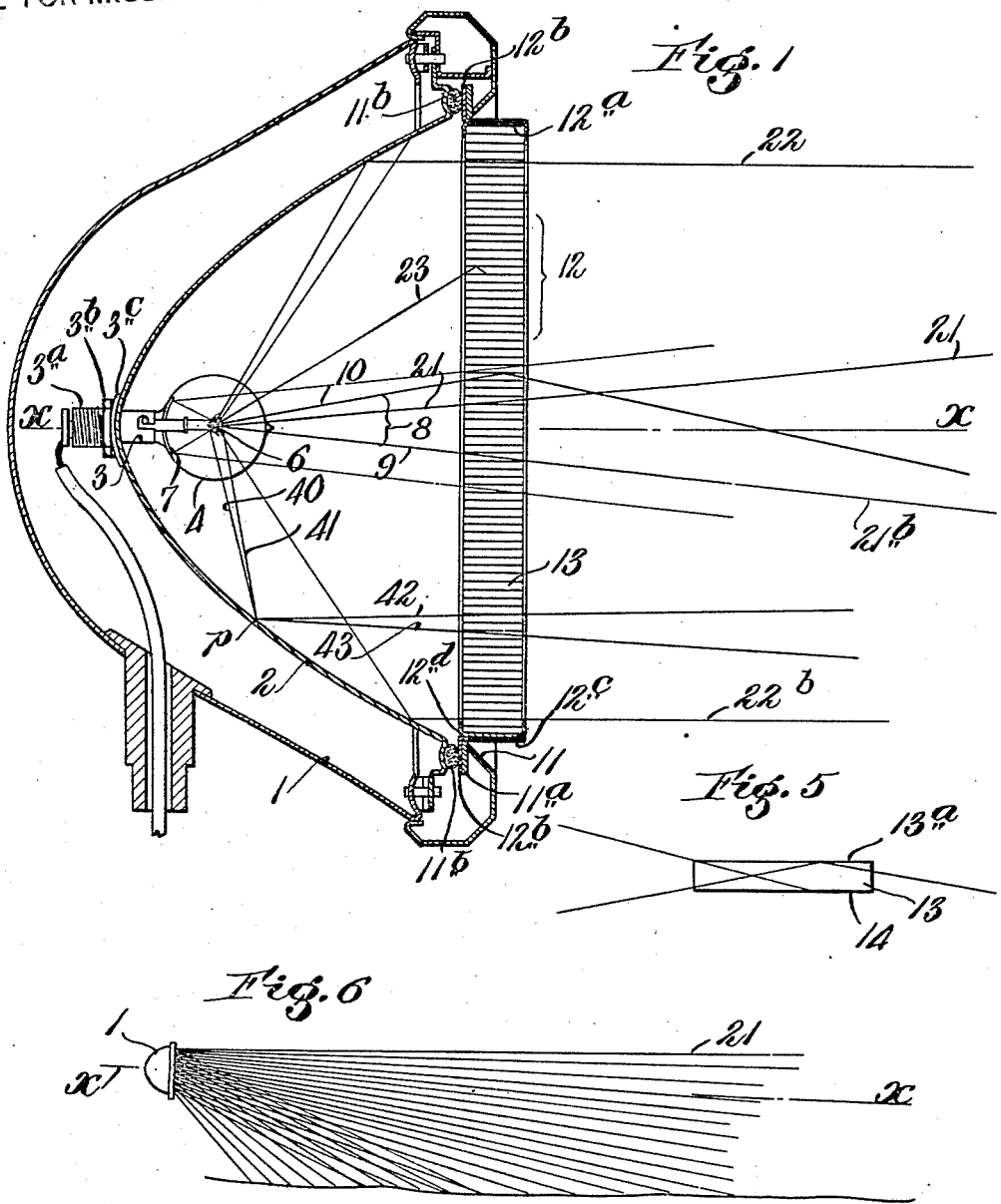
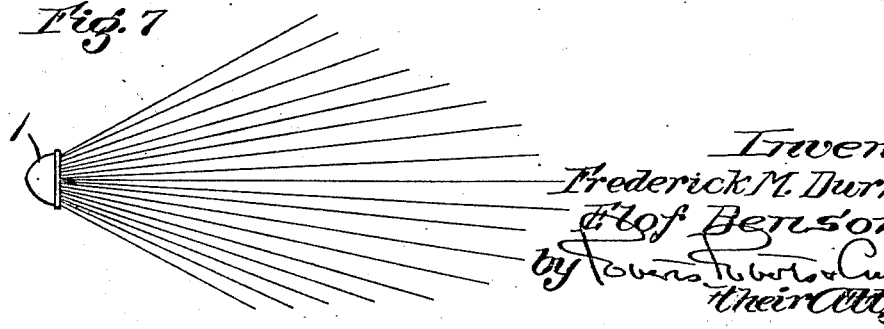
Inventors,
Frederick M. Durkee,
Elof Benson,
by Owens Robert Cushman
their Attys.

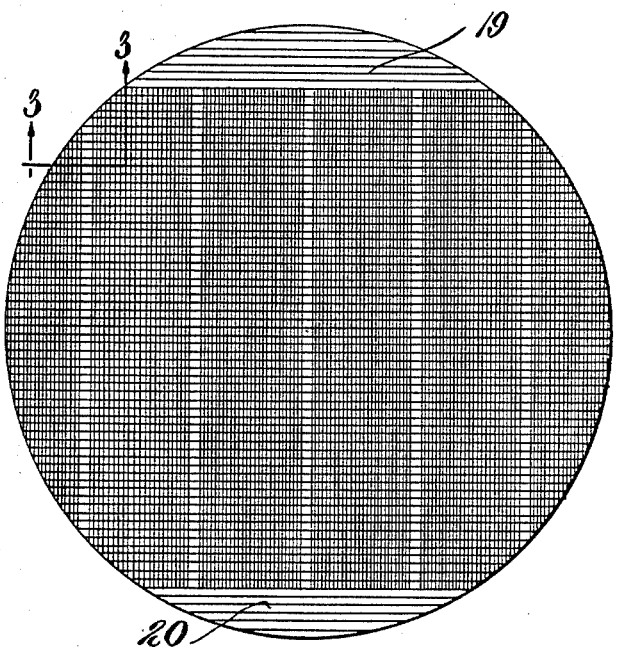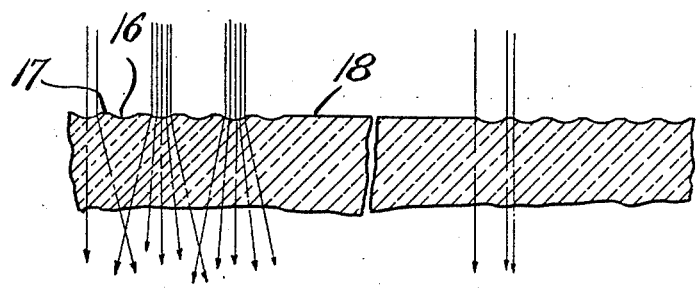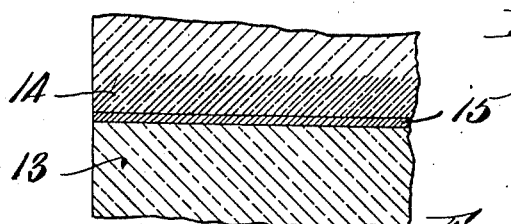

Patented Oct. 9, 1928.

1,687,119

UNITED STATES PATENT OFFICE.

ELOF BENSON, OF NEWTON HIGHLANDS, AND FREDERICK M. DURKEE, OF BROOKLINE, MASSACHUSETTS.

LIGHT-DISTRIBUTING DEVICE.

Application filed March 13, 1923. Serial No. 624,737.

This invention relates to improvements in light distributing devices particularly adapted for use in connection with the headlights of motor or other vehicles.

It is well known that legislation in force or in contemplation is increasingly concerned with exact prescription of the type of illumination to be given by motor vehicle headlights, the particular points emphasized being sufficient illumination directly ahead and substantial freedom from upward glare, coupled with prescribed lateral illumination. Whatever the local variations of requirement, it is increasingly compelled by law that there shall be no bright radiation or reflection from the lights at such height from the ground as to dazzle either pedestrians or drivers of other vehicles upon approach of such lights.

A principal object of this invention is to provide an instrument for projecting a beam of light with a minimum loss of luminous energy, adapted to comply with the restrictions of law, and including in its combination a light-transmitting device or lens which shall permit maximum useful road-illumination from a source of light of familiar and attainable type, such as an incandescent electric light of lawfully-permitted candle-power. A further object is to provide a light-transmitting and selectively inhibiting transparency or lens, of correct functional behavior, so constructed as to enable easy, rapid and relatively cheap manufacture and which shall be durable and effective under severe conditions of use; and to provide improved elements capable of use in such a transparency or lens.

For these and other objects the preferred lens structure is transversely laminated. The invention provides a novel structure for the individual laminæ as well as novel relation in the structure of the combined laminæ by which possibility of improper reflection or refraction of the emanating light rays will be prevented, and by which proper direction of forwardly projected rays and refracted or laterally-deflected rays is made to secure highly efficient central road illumination and sufficient lateral or roadside illumination, with prevention of upwardly-directed glare.

One expression of the invention comprises features of which preferred instances are illustrated in the accompanying drawings, in which, Figure 1 is a vertical section through a headlight and headlight lens embodying features of our invention, the paths of certain of the direct and reflected radiations being diagrammatically indicated;

Figure 2 is a rear elevation of one of our improved lenses;

Figure 3 is a fragmentary horizontal section on line 3—3 of Fig. 2 illustrating a refractive effect of the lens;

Figure 4 is an enlarged detail vertical section similar to Fig. 1;

Figure 5 is a diagram illustrating the operative capacity of one of the laminæ of the lens;

Figure 6 is a diagram in side elevation of the distribution of light projected by one of the devices corresponding to the invention; and Figure 7 is a corresponding diagram in plan explanatory of the distribution of light in a lateral sense.

In the drawings, referring now to Fig. 1, the shell 1 of the motor-vehicle or other headlight may be of conventional design and construction adapted to carry a cover or lens 12, and containing the reflector 2, which as nearly as possible defines the solid of revolution of true parabola. The reflector is provided at its apex with a socket 3 of any suitable form adapted to hold an incandescent lamp 4, the socket being capable of suitable adjustment, for example being threaded at $3^a$ and being screwed into a hole in reinforcement $3^c$ of reflector 2 and held in adjustment by lock-nut $3^b$. The lamp 4 may be of the kind having a filament 6 convoluted upon itself, in order as nearly as possible to develop all of its light in a point lying at the focus of the reflector. Whatever the form of the filament, its height and its fore-and-aft horizontal dimensions are restricted, preferably being less than that of certain transparent laminæ of the light distributing lens 12, presently mentioned. Laterally, the filament may exceed this dimension to any desired extent. The purpose of this is to avoid any substantial parallax, particularly in a vertical and longitudinal sense, of the light source, and hence to insure that the light reflected from the reflector will be as little divergent and as nearly as possible parallel in a vertical sense. If desired the bulb of lamp 4 may be provided as at 7 with a suitable reflecting coating to diminish the area of reflection otherwise shadowed by the socket, according to familiar practice. The extent of the reflector 7 may be sufficient to reflect back the rearward direct radiations through the central section of the lens defined by a certain spherical arc in respect to filament 6 as a center, as shown in Fig. 1 of the drawings, as will be adverted to below.

Secured to the front of the lamp just described, for example by the usual inwardly-flanged metallic rim member 11 and packings 11$^a$ and 11$^b$, lens 12 is held in predetermined relation to the axis $x$ of reflector 2 and the filament 6 at its focus, by engagement of a peripheral flange 12$^b$ of its exterior shell 12$^c$ in which the interiorly flanged annulus 12$^d$ carrying the lens is held. As will best be understood by reference to Fig. 1, lens 12 preferably comprises a large number of like transversely and horizontally disposed thin, plane, parallel-faced glass plates or laminæ 13 of rectangular cross section in any vertical plane, the construction and mode of operation of which are best shown in Figs. 1, 3, 4 and 5.

These laminæ 13 are assembled as presently mentioned and held by compression or cement in the annulus 12$^d$, with their principal lateral dimensions lying in the direction of the axis of reflector 2. Each lamina 13 comprises a thin transparent plate preferably of glass, having integrally united therewith a thin light-absorbent layer 14. While the layer 14 may be of any efficient material, it is preferably of substantially the same index of refraction as the plate 13, and of greatly inferior capacity for transmission of light. For example, the layer 14 is black, or deeply colored, by pigmentation, chemical inclusion, or internal obstruction, and may consist of a flashed or fused layer carrying a suitable metallic oxide, a finely divided metal, or any of the known chromes or colors which will impart to the portion 14 the property of absorption of entering light. Preferably, it is deeply colored. The enameled, flashed or fused coating 14, being of relatively the same index of refraction and optically conjunct with the plate 13, the plane of juncture is not internally reflecting. The lamina may be cut from plate glass previously coated with layer 14, placed in the form of a very thin sheet, or distributed in the powdered state, with or without a suitable flux, on the surface of the sheet from which laminæ are to be formed; and then by the action of heat fused integrally to unite the parts 13 and 14 in a single unitary structure. The layer 14 may be laid on the hot sheet in a molten or plastic state, or formed in any other of the known ways of flash-coating glass.

The laminæ 13 having been cut from the plates so formed, are assembled with their layers 14 all lying in the same direction, and are cemented together by a cement 15 having an index of refraction substantially different from that of the laminæ, such as a glue or bichromated glue; or one of the compounds containing sodium silicate. The laminæ may be left uncemented, if so desired. In either case the uncoated face 13$^a$, Fig. 5, is a totally-reflecting surface for light impinging from within at low angles of incidence.

After being cut into strips of suitable width and assembled, the lateral faces of laminæ 13 are ground and polished to any desired inner and outer surfaces, preferably to surfaces respectively flat, and mutually parallel, to form the inner and outer faces of the lens 12. In the finished lens the laminæ are of a width substantially greater, for example five times greater, than the thickness of their transparent layer 13.

It will be observed that the lens 12 can be ground flat by usual grinding and polishing steps carried out by machine. In practice, it is preferred to prepare the assembled and cemented laminæ in groups larger than the finished lens, and to cut out the lenses by circular grinding, but the method of making the lenses is no part of our present invention.

Referring now to Figs. 2 and 3, the rear surface of the lens is so figured, in the preferred form of the device, as to provide for lateral refractive dispersion of a portion only of the light incident upon it, for the purpose, see Fig. 7, of providing by dispersal of the principal forwardly-reflected beam for illuminating the sides of the roadway.

A preferred way of providing for such refractive dispersion is to provide a large number of shallow, preferably negative, elongate prisms or lenses at the rear surface, the axes of the respective lenses, etc. being vertical and parallel. Preferably these lenses are cylindric, as shown at 16, Fig. 3, but polygonal or other curved, lenticular or prismatic forms having the same effect as cylinders 16 may obviously be substituted.

A preferred arrangement provides, see Figs. 2 and 3, bands or groups of the shallow round grooves 16 having intervening plane surfaces 17 between the grooves and wider plane surfaces 18 between the respective bands or groups of grooves 16, which grooves may extend less than the entire height of the lens; for example, not being formed in the upper portion 19 of the rear face, and, if desired, not extending at the bottom through the space 20. This refractive laterally-dispersive structure may be provided on the front of the lens instead of or in addition to the preferred form shown.

The effect of the lens 12 for lateral dispersion will be apparent from inspection of Figs. 3 and 7 from which it will be seen that parallel rays from the reflector 2 are laterally and variably refracted or dispersed by their variable incidence upon different parts of the surfaces forming the grooves 16, which may have a radius and axial position in relation to the rear plane of the lens sufficient to give a dispersion of from 10° to 20° of the light incident on them, to provide lateral illumination as indicated in Fig. 7. The central rays of each beam striking a groove 16 will pass without lateral bending, in common with the rays incident on the planes 17 and 18, so that there will be a desirable proportion of direct forward illumination from the headlight, as well as the predetermined sidewise diversion a proper proportion of the light.

A preferred way (forming no part of our invention) of forming the grooves 16, which need be only a few thousandths of an inch deep, is to pass the ground and polished plane rear surfaces of the lenses 12, in a direction perpendicular to their laminæ, under cutting rollers of soft metal in turn under pressure-contact with hard metal forming rolls having grooves shaped and spaced as are the grooves 16, the soft cutting roll being supplied with an abrasive fine enough to polish as well as to cut; and, preferably automatically, to cause contact of the cutting roll under pressure to occur only during passage of the desired part of the lens. It makes no difference to the effect of the grooves 16 if they contain striæ or subordinate scratches; the optical effect of these is simply to provide for a compound or subordinate dispersal of the light in planes perpendicular to the grooves 16.

Referring now particularly to Figs. 1, 2 and 5 of the drawings, the effect of the assembled lens secured in position with the grooves 16 extending vertically, and the several laminations horizontally disposed, the concentrated source of light being properly in the focus of the reflector will now be apparent, as diagrammatically illustrated in these figures. That is to say, direct radiations in the angle 8 included between the diagrammatic lines 9 and 10 and reflections incident in the same area will emerge forwardly through the laminations, either by direct transmission, as will be the case for all rays angularly less displaced from the axis than line 21; or will emerge by total reflection from interior impingement on the upper, totally-reflecting surfaces 13ª of the laminæ 13, as will be the case for rays lying in direction between the directions of lines 21 and 10. The direction 21 is the upper angular limit of possible transmission, since rays of angles downward in respect to the axis are not reflected, but are absorbed by the layers 14. But every point of the surface of reflector 2 is a source of reflected light directed forward in parallel rays which will pass freely through the laminations between their reflecting and absorbing surfaces, as is shown, for example, by the lines 22 and 22ᵇ. Radiation in the zone represented by line 23 enters the laminæ 13, but such light is reflected interiorly into the absorbing layer at 14 and is suppressed. All direct radiations below the direction 9 are similarly suppressed by absorption in layer 14, without having been interiorly reflected.

The effect of the combination of devices described containing a very narrow source of illumination, in a vertical and fore-and-aft sense, will now be perceived. Assuming any point $p$ of a reflector 2 having a surface everywhere accurately corresponding to a paraboloid of revolution whose focus is at or near the mean center of the figure of the filament 6, the apparent width or parallax of the filament, as viewed from that point of the reflector, will be represented by the angular divergence of a cone of reflection emanating from that point as a center; the cone of reflected rays will have the same angular magnitude as the apparent width or parallax of the filament from that point. Now if the reflected cone has no greater angular width than the cone between lines 9 and 10, all of its light will pass through the laminæ 13 without obstruction or substantial absorption. Such a cone is illustrated between the lines 40, 41, representing, exaggerated, the parallax of the light-source shown at a typical point $p$, and the corresponding reflected cone will lie between the lines 42, 43, which diverge at the same angle as lines 40, 41 converge, and safely lie within the limiting divergence permitting free transmission through the laminæ 13 upon which they are incident. The relative dimensions indicated for the light-source and laminæ 13 are easily realized in practice; and it will be observed that the reflected cone 42, 43 might be considerably wider, and still all be transmitted. This provides a factor of safety permitting the inevitable inaccuracies of reflector 2 to be without substantial effect. It therefore follows that all the light emitted, except in that segment of the sphere central at 6 and lying between the planes of lines 9 and 22, and that lying between lines 10 and 22ᵇ, is emitted as useful illumination. Thus substantially three-quarters of all the light is used and comparatively high illuminating efficiency is obtained.

The filament 6 may be as long as desired in the horizontal direction perpendicular to the plane of Fig. 1 without any further loss of light. This is because lateral divergence of the reflected beam is unopposed by any effect of the laminæ 13.

The device is mounted in use slightly tilted forward, as indicated in Fig. 6 so that the direction 21 above which there is no primary illumination, will be substantially horizontal, and the other radiations in a beam concentrated on the road.

The absorbent layers 14, in a preferred realization of our invention, are of colored semi-opaque or translucent material, sufficiently absorbent to prevent glare, but which will transmit and reflect from their under surfaces a faint diffused and colored illumination, so that when the vehicle bearing such lights is observed from a point above plane 21 the lights will be sufficiently and warningly visible. But when the layers 14 are substantially opaque, the lights will generally be sufficiently visible from the diffusions due to bubbles, striæ, dust, scratches and the like, which the surfaces of all lenses acquire after having been in use for a short period.

Owing to their position and the direction of the light, the thickness of the layer 14 and of the cement 15 is obstructive of the emitted useful light only in the proportion this combined thickness bears to the vertical thickness of the transparent laminæ 13. According to the described structure, this proportion may be of the order of two one-hundredths or less; laminæ having a glass thickness of 0.1007 in., of which the layer 14 is substantially 0.0015 in. thick and the cement layer 0.0005 in. average thickness, or less, are recommended.

We claim:—

1. A light-distributing device having in combination with a narrow source of light and means for reflection of a vertically narrowly-divergent nearly-parallel beam, a lens disposed across said beam comprised of transparent horizontally disposed laminæ having their principal thickness in the axial direction of the beam, said laminæ each having an upper plane surface adapted to reflect internally impinging light, and bearing an integral absorbing layer adapted to diminish reflection of downwardly-emergent light, said layer having substantially the same index of refraction as the transparent portion integrally united therewith.

2. In a laminated headlight lens a plurality of horizontally disposed laminæ each having a transparent portion and a thin non-transparent portion integrally united therewith, said laminæ being secured to each other by a cement having substantially different index of refraction from that of the transparent portion of the laminæ.

3. In a headlight lens, a plurality of transversely disposed laminæ each having a transparent portion and a thin absorbent layer of substantially the same index of refraction as the transparent portion integrally united therewith.

4. A glass lamina having a polished face and an opposite face consisting of a flash-coating of light absorbent effect, the indices of refraction of the flash-coating and the remainder of the lamina being substantially the same.

Signed by us at Boston, Mass., this 8th day of March, 1923.

ELOF BENSON.
FREDERICK M. DURKEE.